United States Patent [19]

Shimizu et al.

[11] Patent Number: 5,721,324
[45] Date of Patent: Feb. 24, 1998

[54] POLYMERIZATION WITH SCALE PREVENTIVE AGENT DERIVED FROM A CONDENSATE OF AN AZO AND/OR AZOXY COMPOUND AND A QUINONE COMPOUND

[75] Inventors: Toshihide Shimizu, Urayasu; Mikio Watanabe, Kamisu-machi, both of Japan

[73] Assignee: Shin-Etsu Chemical Co., Ltd., Tokyo, Japan

[21] Appl. No.: 554,663

[22] Filed: Nov. 8, 1995

Related U.S. Application Data

[63] Continuation of Ser. No. 266,682, Jun. 28, 1994, abandoned.

[30] Foreign Application Priority Data

Jun. 28, 1993 [JP] Japan ..................... 5-181886

[51] Int. Cl.⁶ ..................... C08F 2/16
[52] U.S. Cl. ..................... 526/62; 526/209; 526/225
[58] Field of Search ..................... 526/62

[56] References Cited

U.S. PATENT DOCUMENTS 4,758,639  7/1988  Koyanagi ..................... 526/62

Primary Examiner—Christopher Henderson
Attorney, Agent, or Firm—Sughrue, Mion, Zinn, Macpeak & Seas, PLLC

[57] ABSTRACT

A polymer scale preventive agent for use in polymerization of a monomer having an ethylenically unsaturated double bond, comprising an alkaline liquid containing a condensation product of: (A) at least one compound selected from the group consisting of azo compounds having at least two amino groups and azoxy compounds having at least two amino groups, and (B) a quinone compound, is disclosed. Also disclosed is a process for producing a polymer, which comprises polymerizing the monomer in a polymerization vessel having a coating on its inner wall, whereby deposition of polymer scale is prevented, the coating having been formed by applying the scale preventive agent and drying the applied agent. According to the process, polymer scale deposition can be effectively prevented, not only on the areas located in the liquid-phase region but also on the areas around the gas-liquid interface in the vessel, so that the need to remove polymer scale every run of polymerization is eliminated and productivity is thereby enhanced. Besides, the process yields a polymer that shows few fish eyes and good whiteness when formed into sheets or the like.

14 Claims, No Drawings

POLYMERIZATION WITH SCALE PREVENTIVE AGENT DERIVED FROM A CONDENSATE OF AN AZO AND/OR AZOXY COMPOUND AND A QUINONE COMPOUND

This is a continuation of application Ser. No. 08/266,682 filed Jun. 28, 1994 now abandoned.

BACKGROUND OF THE INVENTION

1. Field of the Invention

The present invention relates to a polymer scale preventive agent for use in polymerizing a monomer having an ethylenically unsaturated double bond, and a process for producing a polymer using the same.

2. Description of the Prior Art

Heretofore, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers and, therefore, may cause physical disorders in the operators, which has been a very serious problem in recent years.

For preventing polymer scale deposition on the polymerization vessel inner wall and so forth, methods have been known, for example, a method in which a polymer scale preventive agent comprising a polar organic compound such as amine compounds, quinone compounds, aldehyde compounds, etc. is applied to the polymerization vessel inner wall and so on to form a coating and a method in which such compounds are added to an aqueous medium (Japanese Patent Publication (KOKOKU) No. 45-30343, as practiced in some instances of suspension polymerization of vinyl chloride.

However, these methods have the disadvantage that, although the polymer scale preventive effect is exhibited while polymerization is repeated for up to about 5 or 6 batches, the effect diminishes if the number of repeated batches of polymerization exceeds 5 or 6 (that is, the scale preventive effect is poor in durability). The disadvantage is emphasized particularly where a water-soluble catalyst is used for polymerization, and, in this point, the polymer scale prevention according to these methods is unsatisfactory industrially.

For overcoming the above disadvantage, Japanese Pre-examination Patent Publication (KOKAI) No. 53-13689 proposes a method in which the inner wall, etc. of a polymerization vessel are coated with a polymer scale preventive agent comprising a condensation product of an aromatic amine compound as an effective constituent. Where the polymer scale preventive agent is applied to the areas with which monomers come into contact, such as the inner wall surface of a polymerization vessel, and a coating is thereby formed, it is possible to repeat about 100 to 200 batches of polymerization without causing deposition of polymer scale on the areas located in the liquid-phase region inside the polymerization vessel. Besides, even in the above-mentioned case where a water-soluble catalyst is used, deposition of polymer scale in the liquid-phase region is similarly prevented.

However, after the coating of the polymer scale preventive agent comprising a condensation product of an aromatic amine compound as its effective constituent is formed, there still remains a drawback that polymer scale deposition may occur on the areas around the interface between the liquid phase and the gas phase located at an upper portion of the interior of the polymerization vessel.

Once polymer scale deposition occurs on the areas around the interface between the gas and liquid phases, the deposited scale will grow gradually as polymerization runs are repeated, and at last it may peel off to be incorporated into the polymeric product. If the polymeric product with the polymer scale thus mixed therein is processed into formed products such as sheets or the like, the polymer scale causes generation of many fish eyes in the formed products, thereby lowering seriously the quality of the formed products.

Besides, the polymeric product obtained upon polymerization is required to have a high whiteness. That is, when a polymeric product is formed into a sheet or the like without any addition of a coloring agent, the resulting formed product is more or less colored and such coloration, called initial coloration, is desired to be as slight as possible. However, the aforesaid coating of the polymer scale preventive agent which contains a condensation product of an aromatic amine compound may peel off or dissolve in the polymerization mass, to be incorporated into the polymeric product; in such a case, the resulting formed products will have a lowered whiteness, i.e., a higher initial coloration.

SUMMARY OF THE INVENTION

Accordingly it is an object of the present invention to provide a polymer scale preventive agent and a process for producing a polymer, suited to polymerization of a monomer having an ethylenically unsaturated double bond, that can prevent effectively the deposition of polymer scale, not only on the areas in the liquid-phase region but also on the areas around the interface between the gas and liquid phases inside a polymerization vessel, and that makes it possible to produce a polymer having a very small number of fish eyes and slight initial coloration when processed into formed products such as sheets or the like.

The present invention provides, as a means of achieving the above object, a polymer scale preventive agent for use in polymerization of a monomer having an ethylenically unsaturated double bond, comprising an alkaline liquid containing a condensation product of:

(A) at least one compound selected from the group consisting of azo compounds having at least two amino groups and azoxy compounds having at least two amino groups, and (B) a quinone compound.

Also, the present invention provides a process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline liquid containing a condensation product of:

(A) at least one compound selected from the group consisting of azo compounds having at least two amino groups and azoxy compounds having at least two amino groups, and (B) a quinone compound, followed by drying.

According to the present invention, deposition of polymer scale in a polymerization vessel can be effectively prevented, not only on the areas in the liquid-phase region but also on the areas around the interface between the gas phase and the liquid phase.

Therefore, where polymerization is conducted by applying the present invention, the operation of removing polymer scale need not be performed every run of polymerization, and productivity is thereby improved.

In addition, the polymer obtained by application of the present invention can be processed into formed products such as sheets or the like which have very few fish eyes.

Furthermore, the formed products have good quality in regard of initial coloration. More specifically, the formed products have a luminosity index (L value) in the Hunter's color difference equation described in JIS Z 8730 (1980) of, for example, 70 or more in the case of vinyl chloride polymers and 80 or more in the case of SBR.

DETAILED DESCRIPTION OF PREFERRED EMBODIMENTS

(A) Azo compound/azoxy compound having at least two amino groups

The azo compound and/or azoxy compound used as the component (A) is one which has at least two amino groups, and includes, for example, the compounds having the following general formula (1):

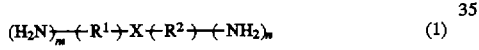

(1)

wherein X is an azo group represented by —N=N— or an azoxy group represented by —N=N(O)—; $R^1$ and $R^2$ may be the same or different and are each a substituted or unsubstituted monovalent hydrocarbon group; and m and n are each an integer of not less than 0, provided m+n has a value of not less than 2.

In the general formula (1) above, the hydrocarbon groups represented by $R^1$ and $R^2$ include, for example, aromatic hydrocarbon groups having 6 to 12 carbon atoms such as phenyl, naphthyl, biphenyl and the like, at least one hydrogen atom of which may be substituted by a group selected from the group consisting of —OH, —COOH, —SO₃H, —Cl, —Br, —I, —NO₂, —COCH₃, —OCH₃, —N(CH₃)₂,

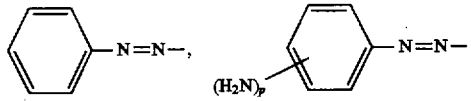

(wherein p is an integer of 1 to 3) and alkyl groups having 1 to 3 carbon atoms. Among these hydrocarbon groups, preferred are phenyl, naphthyl and biphenyl.

Specifically, the azo and azoxy compounds for use as component (A) include, for example, 2,2'-diaminoazobenzene, 2,4'-diaminoazobenzene, 3,3'-diaminoazobenzene, 4,4'-diaminoazobenzene, 4,4'-diaminoazonaphthalene, 3,3'-diamino-p-azoxytoluene, 3,3'-diamino-o-azoxytoluene, 4,4'-diamino-o-azoxytoluene, 5,5'-diamino-o-azoxytoluene, 6,6'-diamino-m-azoxytoluene, C.I. Disperse Blue 11, C.I. Direct Black 38, and the like.

(B) Quinone compound

The quinone compound (B) includes, for example, the compounds of the following general formulas (2) and (3):

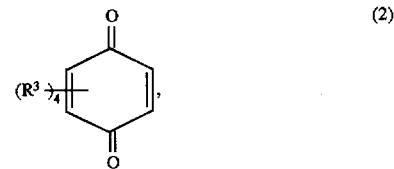

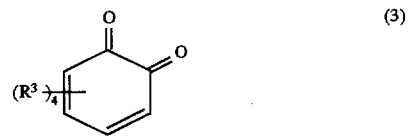

wherein in the formulas (2) and (3), $R^3$ is a group selected from the group consisting of —H, —NH₂, —Cl, —Br, —OH, —NO₂, —COCH₃, —OCH₃, —N(CH₃)₂, —COOH, —SO₃H and alkyl groups having 1 to 3 carbon atoms;

and the compounds of the following general formulas (4) and (5):

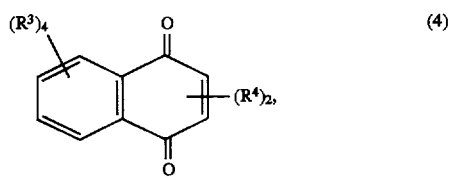

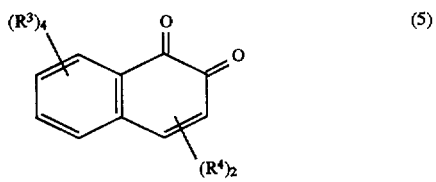

wherein in the formulas (4) and (5), $R^3$ is as defined above, and $R^4$ is a group selected from the group consisting of —H, —Cl, —Br, —OH, —COCH₃, —OCH₃, —CH₃, —COOH and —SO₃H.

Specifically, the compounds of the above general formulas (2) and (3) include, for example, o-, m- and p-benzoquinones, hydroxy-p-benzoquinone, chloro-p-benzoquinone, bromo-p-benzoquinone, duroquinone, chloranil and the like.

Specific examples of the above general formulas (4) and (5) include 6-methyl-1,4-naphthoquinone, 2-methyl-1,4-naphthoquinone, lawsone, juglone, plumbagin, β-naphthoquinone, β-naphthoquinone and the like.

Among the quinone compounds (B) above, preferred are o- and p-benzoquinones, α-naphthoquinone, β-naphthoquinone and lawsone.

The quinone compounds (B) may be used either singly or in combination of two or more.

Condensation reaction

The condensation product of (A) the azo compound and/or azoxy compound having at least two amino groups with (B) the quinone compound, which is the indispensable constituent of the polymer scale preventive agent according to the present invention, can be prepared by reacting the components (A) and (B) with each other in a suitable solvent, optionally in the presence of a catalyst as required, normally at a temperature of room temperature to 200° C. for 0.5 to 100 hours, and preferably at room temperature to 150° ° C. for 3 to 30 hours.

Since the quinone compound (B) acts also as a condensation catalyst, it is normally unnecessary to add other condensation catalyst to the reaction system. However, other condensation catalysts than the component (B) may be added, as required. The other condensation catalysts which can be added include, for example, elemental or molecular simple-substance halogens such as iodine, bromine, chlorine, fluorine and the like; oxo-acids and oxo-acid salts of halogen, such as iodic acid, periodic acid, potassium periodide, sodium perchlorate and the like; inorganic peroxides such as hydrogen peroxide, sodium peroxide, potassium persulfate, ammonium persulfate and the like; organic peroxides such as peracetic acid, benzoyl peroxide, cumene hydroperoxide, perbenzoic acid, p-menthane hydroperoxide and the like; chlorides and sulfates of a metal selected from the group consisting of iron and copper, such as ferrous chloride, ferric chloride, copper sulfate, cuprous chloride and the like; azo compounds such as $\alpha,\alpha'$-azobisisobutyronitrile, $\alpha,\alpha'$-azobis-2,4-dimethylvaleronitrile and the like; aromatic nitro compounds such as nitrobenzene, o-, m- and p-oxynitrobenzenes, o-, m- and p-nitroanisoles, o-, m- and p-chloronitrobenzenes, o-, m- and p-nitrobenzoic acids, o-, m- and p-nitrobenzenesulfonic acids, and the like; and so forth.

As a solvent for carrying out the above condensation reaction, organic solvents such as alcohols, ketones, esters and the like can be used, among which preferred are those organic solvents which are miscible with water. Preferable examples of the organic solvents miscible with water include alcohols such as methanol, ethanol, propanol and the like, ketones such as acetone, methyl ethyl ketone and the like, and esters such as methyl acetate, ethyl acetate and the like, among which particularly preferred are alcohols. Further, mixed solvents of water and such an organic solvent miscible with water as above-mentioned may also be used.

The medium in which the condensation reaction is carried out, normally has a pH of 1 to 13, and pH adjusters may be used without any particular restrictions.

The relative amounts of the azo compound and/or azoxy compound (A) and the quinone compound (B) to be brought into the condensation reaction depend on the kinds of the components (A) and (B) and solvent used, reaction temperature, reaction time and so on. Normally, it is preferable to use the component (B) in an amount of 0.01 to 10 parts by weight, more preferably from 0.1 to 5 parts by weight, per part by weight of the component (A). If the amount of the component (B) is too large or too small, the resulting condensation product has a lower effect in preventing polymer scale deposition.

Polymer scale preventive agent comprising an alkaline liquid containing a condensation product of the components (A) and (B)

The polymer scale preventive agent according to the present invention comprises an alkaline liquid containing a condensation product of the component (A) and the component (B). The polymer scale preventive agent is applied to inner wall surfaces, etc. of a polymerization vessel and is dried to form a coating, whereby polymer scale can be prevented from being deposited on the polymerization vessel inner wall or the like.

The polymer scale preventive agent may be prepared, for example, by adding a solvent (which will be described below) to the condensation product-containing liquid obtained upon the aforesaid condensation reaction and controlling the pH of the liquid to the alkaline side, as required. Alternatively, the polymer scale preventive agent may be prepared by putting the condensation product-containing liquid into cold water to precipitate the condensation product, then separating the precipitate by filtration and drying it, adding the solvent (described below) to the dried precipitate, and controlling the pH of the resulting liquid to the alkaline side.

Because the polymer scale preventive agent of the present invention is made alkaline, the solubility of the condensation product of the components (A) and (B) in the solvent is improved and a uniform liquid can be obtained. Therefore, by applying the polymer scale preventive agent to the polymerization vessel inner wall surfaces, etc., an improved scale preventive effect can be obtained. The pH of the inventive polymer scale preventive agent preferably ranges from 7.5 to 13.5, more preferably from 8.0 to 12.5. For pH adjustment, alkaline compounds can be used, for example, alkali metal compounds such as LiOH, NaOH, KOH, $Na_2CO_3$, $Na_2HPO_4$ and the like, ammonium compounds such as $NH_4OH$ and the like, organic amine compounds such as ethylenediamine, monoethanolamine, diethanolamine, triethanolamine, and so forth.

The solvent for use in preparation of the polymer scale preventive agent of the present invention includes, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol and the like; ketones such as acetone, methyl ethyl ketone, methyl isobutyl ketone and the like; esters such as methyl formate, ethyl formate, methyl acetate, ethyl acetate, methyl acetoacetate and the like; ethers such as 4-methyldioxolan, ethylene glycol diethyl ether and the like; furans; aprotic solvents such as dimethylformamide, dimethyl sulfoxide, acetonitrile and the like; and so forth. These solvents may be used either singly or as a mixed solvent of two or more thereof on a case-by-case basis.

Among the above solvents, preferred are water and mixed solvents of water and an organic solvent miscible with water. The organic solvents miscible with water include, for example, alcohols such as methanol, ethanol, propanol and the like; ketones such as acetone, methyl ethyl ketone and the like; and esters such as methyl acetate, ethyl acetate and the like. The mixed solvents of water and an organic solvent miscible with water preferably contain the organic solvent in such an amount that there is no fear about inflammation, explosion or the like and safety in handling is ensured as to virulence, etc. Specifically, the amount of the organic solvent is preferably not more than 50% by weight, a more preferable amount being not more than 30% by weight.

The concentration of the condensation product in the alkaline liquid is not particularly limited, as long as the total coating weight described later can be obtained. Normally, the concentration of the condensation product is on the order of 0.001 to 5% by weight, a preferable concentration being on the order of 0.01 to 1% by weight.

In order to further enhance the scale preventive effect, the polymer scale preventive agent of the present invention preferably comprise (C) at least one member selected from the group consisting of water-soluble polymeric compounds, inorganic colloids and alkali metal silicates. More preferably, the polymer scale preventive agent comprises a water-soluble polymeric compound together with an inorganic colloid and/or an alkali metal silicate. Presumably, these additives interact with the condensation product, so that the water-soluble polymeric compound improves hydrophilic nature of the surface of the coating whereas each of the inorganic colloid and the alkali metal silicate increases the adhesion of the coating to the inner wall, etc. of the polymerization vessel.

Water-soluble polymeric compound

The water-soluble polymeric compounds include, for example, amphoteric polymeric compounds such as gelatin and casein, anionic polymeric compounds such as polyacrylic acid, polystyrenesulfonic acid, carboxymethyl cellulose, and alginic acid, cationic nitrogen-containing polymeric compounds such as polyvinyl pyrrolidone and polyacrylamide, hydroxyl-containing polymeric compounds such as polyvinyl alcohol, hydroxyethyl cellulose, hydroxypropyl cellulose and pectin, and so forth.

Among the water-soluble polymeric compounds above, preferred are gelatin, casein, polyacrylic acid, carboxymethyl cellulose, polyvinyl pyrrolidone and pectin.

The water-soluble polymeric compounds above may be used either singly or in combination of two or more.

Inorganic colloid

The inorganic colloids may be, for example, those obtained by a condensing method or a dispersing method using water as a dispersion medium, with the colloidal particles ranging from 1 to 500 mµ in size.

Specifically, the applicable inorganic colloids include, for example, colloids of an oxide, a hydroxide or a mixture thereof, the oxide and hydroxide being those of a metal such as aluminum, thorium, titanium, zirconium, antimony, tin, iron and the like; colloids of tungstic acid, vanadium pentoxide, gold and silver; silver iodide sol; colloids of selenium, sulfur, silica and the like; and so forth. Among these, preferred are colloids of an oxide, a hydroxide or a mixture thereof, the oxide and hydroxide being those of a metal selected from the group consisting of aluminum, titanium, zirconium, tin and iron; and colloidal silica.

Alkali metal silicate

The alkali metal silicates include, for example, metasilicates ($M_2SiO_3$), orthosilicates ($M_4SiO_4$), disilicates ($M_2Si_2O_3$), trisilicates ($M_3Si_3O_7$), sesquisilicates ($M_4Si_3O_{10}$) and the like of alkali metals such as lithium, sodium, potassium and the like (wherein M stands for an alkali metal such as lithium, sodium and potassium); and water glass.

The members of component (C) described above may be used either singly or in combination of two or more.

The amount of the component (C) which may be added to the polymer scale preventive agent is normally 0.01 to 10 parts by weight, preferably 0.05 to 5 parts by weight, per part of the condensation product of the components (A) and (B).

In a preferred mode of adding the component (C), a combination of the water-soluble polymeric compound and the inorganic colloid or a combination of the water-soluble polymeric compound and the alkali metal silicate is used. Where the water-soluble polymeric compound and the inorganic colloid are used in combination, the amount of the inorganic colloid is preferably 5 to 3,000 parts by weight, more preferably 50 to 1,000 parts by weight, per 100 parts by weight of the water-soluble polymeric compound. Where the waters-soluble polymeric compound and the alkali metal silicate are used in combination, the amount of the alkali metal silicate is preferably 5 to 3,000 parts by weight, more preferably 50 to 1,000 parts by weight, per 100 parts by weight of the water-soluble polymeric compound.

Formation of coating

The polymer scale preventive agent prepared as described above, comprising an alkaline liquid containing a condensation product of the components (A) and (B), is used to form a coating on inner wall surfaces of a polymerization vessel. To form the coating, first the agent is applied to the inner wall surfaces of the polymerization vessel. Then, the applied agent is dried sufficiently at a temperature ranging, for example, from room temperature to 100° C., Optionally followed by washing with water.

The polymer scale preventive agent is preferably applied to not only the inner wall surfaces of a polymerization vessel but also other areas with which the monomer comes into contact during polymerization, for example, stirring blades, stirring shaft, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, the inner surfaces, etc. of equipment and pipes of an unreacted monomer recovery system. Specifically, such areas include the inner surfaces of monomer distillation columns, condensers, monomer stock tanks, valves, and so on.

The method of applying the polymer scale preventive agent to the inner wall surfaces of a polymerization vessel is not particularly restricted, and includes, for example, brush coating, spray coating, a method by filling the polymerization vessel with the polymer scale preventive agent followed by withdrawal thereof, and the automatic coating methods as disclosed in Japanese Pre-examination Patent Publication (KOKAI) Nos. 57-61001 and 55-36288, Japanese Patent Publication (KOHYO) Nos. 56-501116 and 56-501117, and Japanese Pre-examination Patent Publication (KOKAI) No. 59-11303, etc.

The method of drying wet coated surfaces provided by application of the polymer scale preventive agent, is not restricted, either. For example, the following methods can be used: a method in which, after the agent is applied, hot air with a suitable elevated temperature is blown to the coated surface; a method in which the inner wall surfaces of a polymerization vessel and the surfaces of others parts to be coated are preliminarily heated, for example, to a temperature of 30° to 80° C., and the polymer scale preventive agent is directly applied to the heated surfaces; and so on. After dried, the coated surfaces are washed with water if necessary.

The coating obtained in this manner has a total coating weight after dried of normally 0.001 to 5 g/m², preferably 0.05 to 2 g/m².

The formed coating has good durability and retains the polymer scale-preventing action; therefore, the above-described coating operation may not necessarily be carried out every batch of polymerization, but may be conducted every 1 to 10-odd batches of polymerization. Accordingly, productivity is improved.

Polymerization

After the formation of the coating on the inner wall surfaces of a polymerization vessel, and preferably also on other areas with which monomer may come into contact during polymerization, etc. by the coating operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is carried out according to conventional procedures.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; monomers such as butadiene, chloroprene, isoprene and the like; styrene; acrylonitrile; vinylidene halides; vinyl ethers; and so forth. These monomers may be used either singly or in combination of two or more.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process of the present invention is more suited to polymerizations in an aqueous medium, such as suspension polymerization and emulsion polymerization.

In the following, taking the cases of suspension polymerization and emulsion polymerization as an example, general procedures of polymerization will be described.

First, water and a dispersing agent are charged into a polymerization vessel, and then a polymerization initiator is charged. Subsequently, the polymerization vessel is evacuated to reduce the internal pressure to a value of 0.1 to 760 mmHg, and a monomer is then charged, whereupon the internal pressure usually takes a value of 0.5 to 30 kgf/cm$^2$.G. Subsequently, polymerization is carried out at a reaction temperature of 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel has fallen to a value of 0 to 7 kgf/cm$^2$.G or when cooling water which is let flow into and out of a jacket provided around the polymerization vessel has come to show approximately equal inlet and outlet temperatures (i.e., when liberation of heat due to polymerization reaction has subsided). The amounts of the water, dispersing agent and polymerization initiator to be charged for polymerization are normally 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as the polymerization medium, in place of water. A dispersing agent may be used, if necessary. The other conditions for polymerization are generally the same as those described for suspension and emulsion polymerizations.

In bulk polymerization, after a polymerization vessel is evacuated to a pressure of about 0.01 mmHg to about 760 mmHg, a monomer and a polymerization initiator are charged into the polymerization vessel, and then polymerization is carried out at a reaction temperature of −10° C. to 250° C. For example, the reaction temperature is 30° to 80° C. for polymerization of vinyl chloride, and is 50 to 150° C. for polymerization of styrene.

Where polymerization is carried out by applying the process of the present invention, it is possible to prevent polymer scale from being deposited, regardless of the materials of the inner wall, etc. of a polymerization vessel. For example, where the polymerization vessel is made of a stainless steel or other steel as well as where the polymerization vessel is a glass-lined one or the like, the polymer scale deposition can be prevented from occurring during polymerization.

Those additive materials which are conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), gelatin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DDP, DBP, etc.; chain transfer agents such as mercaptans (e.g. t-dodecyl mercaptan), trichloroethylene, etc.; pH adjusters, and so forth.

In addition to being used for formation of the coating on the inner wall surfaces, etc. of the polymerization vessel, the polymer scale preventive agent of the present invention may further be added directly to the polymerization system, whereby a further enhanced effect in preventing deposition of polymer scale can be obtained. In that case, the addition amount of the agent suitably ranges from about 10 to about 1,000 ppm based on the total weight the monomer or monomers charged into the polymerization vessel. At the time of adding the polymer scale preventive agent, care should be taken not to affect adversely the fish eye, bulk specific gravity, particle size distribution or other qualities of the resulting polymeric product.

EXAMPLES

The present invention will now be described in detail below, with reference to working examples thereof and comparative examples. In the tables below, the experiments bearing a No. marked with * are comparative examples, and the other experiments, bearing a non-marked No., are working examples of the present invention.

Production Example 1

Production of condensation product No. 1

A 2-liter reaction vessel equipped with a reflux condenser was charged with 900 g of methanol and 40 g of 4,4'-diaminoazobenzene as an azo compound having at least two amino groups (A), followed by stirring at room temperature to dissolve 4,4'-diaminoazobenzene in methanol.

To the methanol solution thus obtained, 60 g of p-benzoquinone was added as a quinone compound (B). After heating to 65° C., the reactants in the vessel were reacted at 65° C. for 10 hours. After the reaction was over, the reaction system was cooled to give a methanol solution of a condensation product, which is hereinafter referred to as condensation product No. 1.

Production of condensation product Nos. 2 to 8

Condensation products were produced in the same manner as in the above production of the condensation product No. 1 except for using the azo compound or azoxy compound having at least two amino groups (A) and quinone compound (B) given in Table 1 and the solvent shown in Table 2. Total concentration of (A)+(B), weight ratio of (A):(B), reaction temperature and reaction time are also set forth in Table 2.

TABLE 1

| Condensation product No. | (A) Azo compound or azoxy compound | (B) Quinone compound |
|---|---|---|
| 1 | 4,4'-Diaminoazobenzene | p-Benzoquinone |
| 2* | — | p-Benzoquinone |
| 3* | 4,4'-Diaminoazobenzene | — |
| 4 | 4,4'-Diaminoazobenzene | α-Naphthoquinone |
| 5 | 4,4'-Diamino-o-azoxytoluene | α-Naphthoquinone |

TABLE 2

| Condensation product No. | Total conc. of (A) + (B) (wt. %) | (A):(B) (wt.ratio) | Solvent | Reaction temp. (°C.) | Reaction time (Hr) |
|---|---|---|---|---|---|
| 1 | 10 | 1:1.5 | Methanol | 65 | 10 |
| 2* | 10 | — | Methanol | 65 | 10 |
| 3* | 10 | — | Methanol | 65 | 10 |
| 4 | 10 | 1:3 | Methanol | 65 | 10 |
| 5 | 5 | 1:0.5 | Ethanol | 65 | 20 |

Example 1 (Experiment Nos. 101 to 108)

Using a stainless-steel polymerization vessel having an internal capacity of 1,000 liters and equipped with a stirrer, polymerization was carried out as below.

In preparing a polymer scale preventive agent in each experiment, the condensation product (E), water-soluble polymeric compound (C), at least one member selected from the group consisting of inorganic colloids and alkali metal silicates (D), pH adjuster and solvent set forth in Table 3 were used in such amounts as to produce the solvent composition, total concentration of (E)+(C)+(D), weight ratio of (E):(C):(D), and pH shown in Table 3. The inorganic colloids (a to g, in Tables 3 and 6) which were used as component (D) in this example and Example 2 described below are shown in Table 5.

In each experiment, the polymer scale preventive agent prepared as above was applied to the inner wall of the polymerization vessel and to the stirring shaft, stirring blades and the like parts with which the monomer comes into contact during polymerization. The polymer scale preventive agent thus applied was dried by heating at 40° C. for 15 minutes to form a coating, followed by washing the inside of the vessel with water.

Subsequently, in each experiment, polymerization was conducted as follows. The polymerization vessel provided with the coating by the coating treatment as above was charged with 400 kg of water, 200 kg of vinyl chloride, 250 g of partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the polymerization was finished, the polymeric product and unreacted monomer were recovered, and the inside of the polymerization vessel was washed with water to remove residual resin.

Thereafter, the above process including the polymerization and the washing of the inside of polymerization vessel with water was repeated batchwise, without carrying out the coating operation, the repetition number of batch being given in Table 4. After the final batch was over, the amount of polymer scale deposited on areas located in the liquid-phase region and that on areas around the interface between gas and liquid phases inside the polymerization vessel were determined according to the method described below. The results are given in Table 4.

Measurement of the amount of polymer scale deposited

The scale deposited in an area of 10 cm square at a predetermined location on the inner wall of a polymerization vessel is scraped off with a stainless steel spatula as completely as can be confirmed with the naked eye, and then the scraped scale is weighed on a balance. The measured value is multiplied by 100 to obtain the amount of the deposited polymer scale per area of 1 m$^2$.

Besides, the number of fish eyes appearing upon formation of a polymer into a sheet was measured with respect to the polymers obtained in the experiments, according to the method below. The results are given in Table 4.

Measurement of fish eyes

A hundred (100) parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are mixed. The resulting mixture is kneaded at 150° C. for 7 minutes with 6 inch rolls, and then formed into a sheet 0.2 mm thick. The obtained sheet is examined for the number of fish eyes per 100 cm$^2$ by light transmission.

Further, measurement of luminosity index (L value) of a sheet formed from a polymer was carried out, according to the method below, with respect to the polymers produced in the experiments. The results are given in Table 4.

Measurement of luminosity index (L value)

A hundred (100) parts by weight of the obtained polymer, 1 part by weight of a tin laurate stabilizing agent (TS-101, product of Akishima Chemical Co.) and 0.5 part by weight of a cadmium stabilizing agent (C-100J, product of Katsuta Kako Co.), and 50 parts by weight of dioctyl phthalate as a plasticizer are kneaded at 160° C. for 5 minutes with a twin roll mill, and then formed into a sheet 1 mm thick. Subsequently, this sheet is placed in a mold measuring 4×4×1.5 cm, heated at 160° C. under a pressure of 65 to 70 kgf/cm$^2$ for 0.2 hour and press molded under the same conditions to prepare a test specimen. This test specimen is measured for luminosity index L in the Hunter's color difference equation described in JIS Z 8730 (1980). The greater the value of L, the higher the whiteness evaluated, namely, the slighter the initial coloration evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L=10Y^{1/2}$ described in JIS Z 8730 (1980).

composition, total concentration of (E)+(C)+(D), weight ratio of (E):(C):(D), and pH given in Table 6. The polymer scale preventive agent thus prepared was applied to the inner wall of the polymerization vessel and to the stirring shaft,

TABLE 3

| | | | | Polymer scale preventive agent | | | |
|---|---|---|---|---|---|---|---|
| Exp. No. | (E)Condensation product No. | (C) Water-soluble polymeric compound | (D) Inorganic colloid and/or alkali metal silicate | Total conc. of (E) + (C) + (D) (wt. %) | (E):(C):(D) (wt. ratio) | pH adjuster (pH) | Solvent (wt. ratio) |
| 101 | 1 | Gelatin | a | 0.5 | 100:100:100 | NaOH (11.0) | Water:Methanol (70:30) |
| 102* | 2* | Gelatin | b | 0.5 | 100:100:100 | NaOH (11.0) | Water:Methanol (70:30) |
| 103* | 3* | Gelatin | c | 0.5 | 100:100:100 | NaOH (11.0) | Water:Methanol (70:30) |
| 104 | 4 | Polyvinyl pyrrolidone | d | 0.5 | 100: 50:200 | NaOH (11.0) | Water:Methanol (80:20) |
| 105 | 5 | — | — | 0.5 | — | Ethylenediamine (11.0) | Water:Methanol (90:10) |

TABLE 4

| | | Results of polymerization | | |
|---|---|---|---|---|
| | | Polymer scale amount (g/m²) | | Luminosity |
| Exp. No. | Repetition number of batch | Liquid phase | Around gas-liquid interface | Number of fish eyes | index (L) |
| 101 | 3 | 0 | 7 | 11 | 73.0 |
| 102* | 2 | 17 | 93 | 36 | 73.0 |
| 103* | 2 | 18 | 92 | 37 | 73.0 |
| 104 | 3 | 0 | 8 | 10 | 73.0 |
| 105 | 3 | 1 | 20 | 22 | 73.0 |

TABLE 5

| Inorganic colloid | Diameter of colloidal particles (mμ) | Name of article | Manufacturer |
|---|---|---|---|
| a | 10–20 mμ | Snowtex O * (colloidal silica) | Nissan Chemical Industries, Ltd. |
| b | 5–7 mμ | Snowtex CXS-9 * (colloidal silica) | Nissan Chemical Industries, Ltd. |
| c | 100–200 mμ | Titanium oxide | Nissan Chemical Industries, Ltd. |
| d | 10–20 mμ | Aluminum oxide | Nissan Chemical Industries, Ltd. |
| e | 60–70 mμ | Zirconium oxide | Nissan Chemical Industries, Ltd. |
| f | 20–50 mμ | Tin oxide | Nissan Chemical Industries, Ltd. |
| g | 10–15 mμ | Iron hydroxide | produced by the present inventors |

Note
*: trade names

Example 2 (Experiment Nos. 201 to 208)

Using a stainless-steel polymerization vessel having an internal capacity of 20 liters and equipped with a stirrer, polymerization was carried out as below.

In preparation of a polymer scale preventive agent in each experiment, the condensation product (E), water-soluble polymeric compound (C), at least one member selected from the group consisting of inorganic colloids and alkali metal silicates (D), pH adjuster and solvent set forth in Table 6 were used in such amounts as to produce the solvent stirring blades and the like areas with which the monomer comes into contact during polymerization. The polymer scale preventive agent applied was dried by heating at 40° C. for 15 minutes to form a coating, followed by washing the inside of the polymerization vessel with water.

Subsequently, in each experiment, polymerization was carried out as follows. The polymerization vessel provided with the coating as above was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged into the vessel, and polymerization was carried out at 50° C. for 20 hours. After the polymerization was completed, the polymeric product and unreacted monomers were recovered, followed by washing the inside of the vessel with water to remove residual resin.

Thereafter, the above process including the polymerization and the washing of the inside of the polymerization vessel with water was repeated batchwise, without carrying out the coating operation, the repetition number of batch being given in Table 7. After the final batch was over, the amount of polymer scale deposited on areas located in the liquid-phase region and that on areas around the interface between gas and liquid phases inside the polymerization vessel were determined according to the same method as in Example 1. The results are given in Table 7.

Besides, measurement of luminosity index (L value) of a sheet formed from a polymer was carried out with respect to each of the polymers produced in the experiments, according to the method below. The results are given in Table 7.

Measurement of luminosity index (L value)

To 1 kg of the polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin.

The resin was placed in a mold measuring 9×9×0.1 cm (depth), heated at 195° C. under a pressure of 50 to 60 kgf/cm² for 0.2 hour and press molded under a final pressure of 80 kgf/cm² to prepare a test specimen. This test specimen was measured for luminosity index L in the same manner as in Example 1.

TABLE 6

| Exp. No. | (E)Condensation product No. | (C) Water-soluble polymeric compound | (D) Inorganic colloid and/or alkali metal silicate | Total conc. of (E) + (C) + (D) (wt. %) | (E):(C):(D) (wt. ratio) | pH adjuster (pH) | Solvent (wt. ratio) |
|---|---|---|---|---|---|---|---|
| 201 | 1 | Polyacrylic acid | e | 0.5 | 100:100:100 | NaOH (12.0) | Water:Methanol (70:30) |
| 202* | 2* | Polyacrylic acid | f | 0.5 | 100:100:100 | NaOH (12.0) | Water:Methanol (70:30) |
| 203* | 3* | Polyacrylic acid | g | 0.5 | 100:100:100 | NaOH (12.0) | Water:Methanol (70:30) |
| 204 | 4 | Pectin | b | 0.5 | 100:100:200 | NaOH (12.0) | Water:Methanol (70:30) |
| 205 | 5 | Casein | Water glass | 0.5 | 100: 50:200 | Ethylenediamine (11.5) | Water:Methanol (70:30) |

TABLE 7

| | | Results of polymerization | | |
|---|---|---|---|---|
| | Repetition | Polymer scale amount (g/m²) | | Luminosity |
| Exp. No. | number of batch | Liquid phase | Around gas-liquid interface | index (L) |
| 201 | 2 | 0 | 7 | 85.0 |
| 202* | 1 | 21 | 139 | 85.0 |
| 203* | 1 | 20 | 137 | 85.0 |
| 204 | 2 | 0 | 7 | 85.0 |
| 205 | 2 | 0 | 3 | 85.0 |

Example 3

Using a stainless-steel polymerization vessel having an internal capacity of 20 liters and equipped with a stirrer, polymerization was carried out as below.

The polymer scale preventive agent used in Experiment No. 201 of Example 2 above was applied to the inner wall of the polymerization vessel and to the stirring shaft, stirring blades and the like parts with which monomers come into contact during polymerization. The agent applied was dried by heating at 50° C. for 15 minutes to form a coating, followed by washing with water.

Thereafter, the polymerization vessel provided with the coating as above was charged with 4.0 kg of water and 6 g of sodium dodecylbenzenesulfonate, and temperature was raised to 60° C. with stirring the contents of the vessel. After the gas phase in the polymerization vessel was replaced with nitrogen gas, the vessel was further charged with 94 g of n-butyl acrylate, 220 g of methyl methacrylate, 5 g of acrylic acid and 5 g of methacrylic acid. Subsequently, 1 g of ammonium persulfate and 1 g of sodium hydrosulfite were charged into the polymerization vessel, and the resulting mixture in the vessel was stirred at 60° C. for 20 minutes.

Furthermore, into the polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution, evenly over a 3-hour period. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

Thereafter, a batch of operations from the formation of the coating through polymerization to the washing of the inside of the polymerization vessel with water as above-described was repeated 50 times. Upon the 50th batch, the amount of polymer scale deposited on areas located in the liquid-phase region and that on areas around the interface between gas and liquid phases inside the polymerization vessel were measured in the same manner as in Example 1. The deposited amount of polymer scale was found to be 0 g/m² on the areas in the liquid-phase region, and 30 g/m² on the areas around the gas-liquid interface.

What is claimed is:

1. A process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline liquid having a pH of 7.5 to 13.5 and containing a condensation product of:

(A) at least one compound selected from the group consisting of azo compounds having the formula (1)

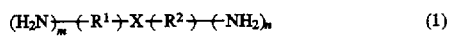

(1)

wherein X is an azo group represented by —N=N— or an azoxy group represented by —N=N(O)—; $R^1$ and $R^2$ may be the same or different and are each a substituted or unsubstituted monovalent hydrocarbon group having 6 to 12 carbon atoms at least one hydrogen atom of which may be substituted by a group selected from the group consisting of —OH, —COOH, —SO₃H, —Cl, —Br, —I, —NO₂, —COCH₃, —OCH₃, N(CH₃)₂,

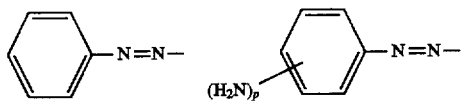

(wherein p is an integer of 1 to 3) and alkyl groups having 1 to 3 carbon atoms; and m and n are each an integer of not less than 0, provided m+n has a value of not less than 2, and (B) a quinone compound, having the formula (2)

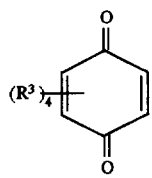

(2)

wherein $R^3$ is a group selected from the group consisting of —H, —$NH_2$, —Cl, —Br, —OH, —$NO_2$, —$COCH_3$, —$N(CH_3)_2$, —COOH, —$SO_3H$ and alkyl groups having 1 to 3 carbon atoms prepared by reacting the components (A) and (B) at a temperature of from room temperature to 150° C. for from 3 to hours, followed by drying.

2. The process of claim 1, wherein said alkaline liquid has been further applied to the other areas than the inner wall with which the monomer comes into contact during polymerization of said polymerization vessel, to form a coating.

3. The process of claim 1, wherein said alkaline liquid has been further applied to the areas with which unreacted monomers come into contact of a system for recovering unreacted monomers, to form a coating.

4. The process of claim 1, wherein the coating has a total coating weight of 0.001 to 5 g/m².

5. The process of claim 1, wherein said monomer having an ethylenically unsaturated double bond comprises at least one monomer selected from the group consisting of vinyl halides; vinyl esters; acrylic acid, methacrylic acid and their esters and salts; maleic acid, fumaric acid and their esters and anhydrides; diene monomers; styrene; acrylonitrile; vinylidene halides; and vinyl ethers.

6. The process of claim 1, wherein said alkaline liquid further comprises:
(C) at least one member selected from the group consisting of water-soluble polymeric compounds, inorganic colloids and alkali metal silicates.

7. The process of claim 1, wherein said aromatic hydrocarbon group is phenyl, naphthyl or biphenyl.

8. The process of claim 16, wherein the component (A) comprises a compound selected from the group consisting of 2,2-diaminoazobenzene, 2,4'-diaminoazobenzene, 3,3'-diaminoazobenzene, 4,4'-diaminoazobenzene, 4,4'-diaminoazonaphthalene, 3,3'-diamino-o-azoxytoluene, 4,4'-diamino-o-azoxytoluene, 5,5'-diamino-o-azoxytoluene, 6,6'-diamino-m-azoxytoluene, azoxytoluene, C.I. Disperse Blue 11, and C.I. Direct Black 38.

9. The process of claim 1, wherein said quinone compound (B) comprises at least one compound selected from the group consisting of o-, m- and p-benzoquinones, hydroxy-p-benzoquinone, chloro-p-benzoquinone, bromo-p-benzoquinone, duroquinone, chloranil, 6-methyl-1,4-naphthoquinone, 2-methyl-1,4-naphthoquinone, lawsone, juglone, plumbagin, α-naphthoquinone, and β-naphthoquinone.

10. The process of claim 1, wherein said quinone compound (B) is o- or p-benzoquinone, α-naphthoquinone, β-naphthoquinone or lawsone.

11. The process of claim 1, wherein said condensation product has been obtained by condensing 1 part by weight of the compound of component (A) with 0.01 to 10 parts by weight of the compound of component (B).

12. The process of claim 6, wherein the component (C) comprises a water-soluble polymeric compound, and an inorganic colloid and/or an alkali metal silicate.

13. The process of claim 1, wherein said alkaline liquid comprises a mixed solvent of water and an organic solvent miscible with water.

14. The process of claim 1, wherein the concentration of said condensation product in said alkaline liquid is 0.001 to 5% by weight.

* * * * *

UNITED STATES PATENT AND TRADEMARK OFFICE
CERTIFICATE OF CORRECTION

PATENT NO. : 5,721,324
DATED : February 24, 1998
INVENTOR(S) : Shimizu et al.

It is certified that error(s) appears in the above-identified patent and that said Letters Patent is hereby corrected as shown below:

In columns 16 and 17 delete claim 1 in its entirety.

Please replace and correct claim 1 as follows:

"1. A process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline liquid having a pH of 7.5 to 13.5 and containing a condensation product of:

(A) at least one compound selected from the group consisting of azo compounds having the formula (1)

(1)

UNITED STATES PATENT AND TRADEMARK OFFICE
CERTIFICATE OF CORRECTION

PATENT NO. : 5,721,324
DATED : February 24, 1998
INVENTOR(S) : Shimizu et al.

It is certified that error(s) appears in the above-identified patent and that said Letters Patent is hereby corrected as shown below:

wherein X is an azo group represented by -N=N- or an azoxy group represented by -N=N(O)-; $R^1$ and $R^2$ may be the same or different and are each a substituted or unsubstituted monovalent hydrocarbon group having 6 to 12 carbon atoms at least one hydrogen atom of which may be substituted by a group selected from the group consisting of -OH, -COOH, -$SO_3H$, -Cl, -Br, -I, -$NO_2$, -$COCH_3$, -$OCH_3$, $N(CH_3)_2$,

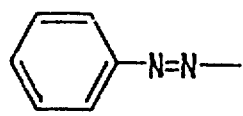 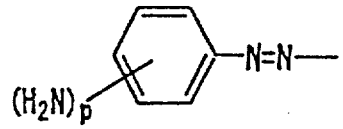

(wherein p is an integer of 1 to 3) and alkyl groups having 1 to 3 carbon atoms; and m and n are each an integer of not less than 0, provided m+n has a value of not less than 2, and

UNITED STATES PATENT AND TRADEMARK OFFICE
CERTIFICATE OF CORRECTION

PATENT NO. : 5,721,324
DATED : February 24, 1998
INVENTOR(S) : Shimizu et al.

It is certified that error(s) appears in the above-identified patent and that said Letters Patent is hereby corrected as shown below:

(B) a quinone compound, having the formula (2)

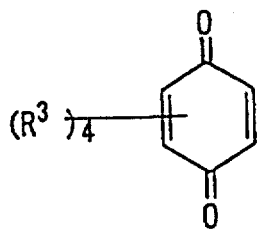

(2)

wherein $R^3$ is a group selected from the group consisting of -H, -$NH_2$, -Cl, -Br, -OH, -$NO_2$, -$COCH_3$, -$N(CH_3)_2$, -COOH, -$SO_3H$ and alkyl groups having 1 to 3 carbon atoms prepared by reacting the components (A) and (B) at a temperature of from room temperature to 150°C for from 3 to 30 hours, followed by drying."

UNITED STATES PATENT AND TRADEMARK OFFICE
CERTIFICATE OF CORRECTION

PATENT NO. : 5,721,324
DATED : February 24, 1998
INVENTOR(S) : Shimizu et al.

It is certified that error appears in the above-identified patent and that said Letters Patent is hereby corrected as shown below:

8. The process of Claim 1, wherein the component (A) comprises a compound selected from the group consisting of 2,2'-diaminoazobenzene, 2,4'-diaminoazobenzene, 3,3'-diaminoazobenzene, 4,4'-diaminoazobenzene, 4,4'-diaminoazonaphthalene, 3,3'-diamino-p-azoxytoluene, 3,3'-diamino-o-azoxytoluene, 4,4'-diamino-o-azoxytoluene, 5,5'-diamino-o-azoxytoluene, 6,6'-diamino-m-azoxytoluene, C.I. Disperse Blue 11, and C.I. Direct Black 38.

Signed and Sealed this

Twelfth Day of May, 1998

*Attest:*

*Attesting Officer*

BRUCE LEHMAN
*Commissioner of Patents and Trademarks*